United States Patent
Jetten et al.

(10) Patent No.: US 7,052,557 B2
(45) Date of Patent: May 30, 2006

(54) PROCESS FOR CLEANING FILTERS

(75) Inventors: Jan Matthijs Jetten, Zeist (NL); Jan Pieter Van Der Lugt, Amersfoort (NL); Hendrik Arend Van Doren, Amersfoort (NL); Mario Tarcisius Raymundus Van Wandelen, Zeist (NL)

(73) Assignee: Nederlandse Organisatie voor Toegepast-Natuurwetenschappelijk Onderzoek (TNO), Delft (NL)

( * ) Notice: Subject to any disclaimer, the term of this patent is extended or adjusted under 35 U.S.C. 154(b) by 0 days.

(21) Appl. No.: 10/501,584

(22) PCT Filed: Jan. 20, 2003

(86) PCT No.: PCT/NL03/00039

§ 371 (c)(1),
(2), (4) Date: Feb. 17, 2005

(87) PCT Pub. No.: WO03/060052

PCT Pub. Date: Jul. 24, 2003

(65) Prior Publication Data

US 2005/0178408 A1    Aug. 18, 2005

(30) Foreign Application Priority Data

Jan. 18, 2002 (EP) .................................. 02075219

(51) Int. Cl.
*B08B 3/08* (2006.01)
*C23G 1/02* (2006.01)
(52) U.S. Cl. ................................ 134/42; 134/3; 134/41
(58) Field of Classification Search .................... 134/3, 134/41, 42
See application file for complete search history.

(56) References Cited

U.S. PATENT DOCUMENTS 6,274,186 B1 * 8/2001 Mol et al. .................... 426/330
6,518,419 B1 * 2/2003 Van Der Lugt et al. ..... 536/105

FOREIGN PATENT DOCUMENTS

| DE | 19503060 A | * | 8/1996 |
| WO | WO 99 15256 A | * | 4/1999 |
| WO | WO0050388 A | * | 8/2000 |

* cited by examiner

Primary Examiner—Zeinab El-Arini
(74) Attorney, Agent, or Firm—The Webb Law Firm

(57) ABSTRACT

Filters used in the food and beverage industry can be cleaned by contacting the filters with a cyclic nitroxyl compound and a reoxidator or with a nitroxonium compound in a bromine-free process. The nitroxyl can be TEMPO or its 4-acetamido or 4-acetoxy derivative, and the nitroxonium compound can be the corresponding oxidized ion obtained by enzymatic or metal catalyzed oxidation. The reoxidator may be a peracid, such as peracetic acid, persulphuric acid or permanganic acid, or a metal complex with a hydroperoxide.

18 Claims, No Drawings

PROCESS FOR CLEANING FILTERS

BACKGROUND OF THE INVENTION

1. Field of the Invention

The invention relates to a process of cleaning food processing equipment, in particular membrane filters which are used for producing foodstuffs or for cleaning water, wherein the filters are contacted with a cyclic nitroxyl compound and a reoxidator, or with a cyclic nitroxonium compound.

2. Description of the Related Art

In the food industry, use is being made to an increasing extent of membrane filters, in particular plastic membranes such as polyvinylpyrrolidone, polysulphone, polyether-sulphone and certain types of polyamides, for removing undesirable insoluble matter from beverages and other liquids. Such membranes are also used for cleaning surface water. Such membranes ensure an expedient removal of undesirable constituents, in particular micro-organisms such as algae, fungi and bacteria.

The problem is, however, that such membrane filters become blocked even after a short time so that they become unusable. The blocked filters can be regenerated, for example by rinsing them through in the opposite direction. However, that is a complicated process and no longer effective in the long term because the contamination accumulates. In addition, it is difficult to remove some persistent organic contaminants in this way.

WO 97/45523 describes the use of 2,2,6,6-tetramethylpiperidine-N-oxyl (TEMPO) as nitroxyl compounds and hypochlorite and hypobromite as a reoxidator for cleaning beer-settling modules. The presence of halogen residues, especially bromine residues is highly undesired in equipment used for preparing or treating beverages and other foodstuffs. Also the effective life time of the filters and their tear strength are negatively affected by the presence of bromine compounds.

WO 99/15256 discloses the use of cyclic nitroxyl compounds such as TEMPO together with a calcium sequestering agent for cleaning filters to be used in purifying surface water.

The oxidation of carbohydrates and other primary alcohols with nitroxyl compounds and peracid, especially peracetic acid in the presence of catalytic amounts of bromine, is known as such from WO 99/57158.

SUMMARY OF THE INVENTION

It was found that filters and other equipment used in the food and beverage industry and in water purification can be effectively cleaned in a halogen-free process by applying a cyclic nitroxyl compound. The reoxidator of the nitroxyl compound can be a peracid, or a hydroperoxide and/or a metal complex, e.g. in the form of an oxidative enzyme.

DESCRIPTION OF THE PREFERRED EMBODIMENTS

In the following description, cyclic nitroxyl compounds to be used in the present invention are exemplified by TEMPO only for the sake of simplicity, but it should be understood that other di-tert-alkyl nitroxyls, such as 4,4-dimethyloxazolidine-N-oxyl (DOXYL), 2,2,5,5-tetramethylpyrrolidine-N-oxyl (PROXYL) and 4-hydroxy-TEMPO and derivatives thereof and those described in WO 95/07303 can be substituted for TEMPO. Especially preferred are TEMPO, 4-acetamido-TEMPO and 4-acetoxy-TEMPO. The catalytic amount of nitroxyl is preferably 0.1–2.5% by weight, based on the primary alcohol, or 0.1–2.5 mol % with respect to the primary alcohol.

The peracid may be any peralkanoic acid such as peracetic acid, perpropionic acid, perlauric acid etc., a substituted alkanoic acid such as peroxytrifluoroacetic acid, an optionally substituted aromatic peracid such as perbenzoic acid or m-chloro-perbenzoic acid, or an inorganic peracid such as persulphuric acid or permanganic acid. The peracids may be formed in situ from a precursor such as the corresponding aldehyde, (carboxylic) acid, acid anhydride, ester or amide, e.g. tetra-acetyl-ethylenediamine (TAED), with a suitable halogen-free oxidising agent, such as hydrogen peroxide or oxygen, either before the oxidation reaction or during the oxidation reaction, or with perborates or percarbonates or the like, in the presence of acylating agents such as TAED. The peracid reoxidises the spent nitroxyl in situ to produce a nitroxonium ion which is the effective oxidator in the cleaning process of the invention. The peracid is typically used in a concentration in the cleaning liquid of between 25 and 2500 ppm (about 25 mg to 2.5 g per 1). The peracids may be used as such, or in the form of a suitable salt, especially an alkali metal salt. A suitable form of persulphuric acid is e.g. Oxone® ($2KHSO_5.KHSO_4.K_2SO_4$), which is commercially available.

The reoxidation of the spent nitroxyl in situ can also be performed using a hydroperoxide or a metal complex or preferably both, wherein the metal complex is an intermediate oxidator. The metal complex may comprise e.g. vanadium, manganese, iron, cobalt, nickel or copper with complexing agents, in particular polyamines, such as 2,2'-bipyridyl, phenanthroline, tetramethyl-ethylenediamine, pentamethyldiethylenetriamine and their cyclic counterparts such as 1,4,7-trimethyl-1,4,7-triazonane, and histidine and its oligomers. The hydroperoxide may be hydrogen peroxide or an alkyl and ar(alk)yl hydroperoxide(such as tert-butyl hydroperoxide), wherein hydrogen peroxide is preferred.

It was found surprisingly that treatment of membrane filters and other equipment with TEMPO and a peracid such as persulphuric acid or a hydroperoxide results in a cleaning performance which is equal to or better than that of treatment with hypochlorite/bromide as described in WO 97/45523, and has the additional advantage that the membrane filter are not attacked by the cleaning agents to any detectable level, as assessed using with membrane strength measurements. Moreover, the absence of halogens is of a considerable advantage, for environmental reasons, but also as to the strength of the equipment treated, especially in the case of membranes.

The nitroxyl can also be oxidised in a separate reaction to form the nitroxonium ion ex situ. This can be effected using metal complexes as described above, such as copper/bipyridyl and oxygen or hydrogen peroxide, or with an oxidative enzyme such as laccase in the presence of oxygen. These processes are described in WO 00/50388 and WO 00/50621, which are incorporated herein by reference. This embodiment has the considerable advantage that the reoxidising agents, such as enzymes, metal complexes, hydrogen peroxide and the like do not come into contact with the filters or other equipment to be purified.

The process of the invention may be used for cleaning filters used in food industry and in feed industry, and equipment used in water purification. Such equipment may especially be used in the production of dairy products, beer, wine, fruit juices and other beverages and liquids used in food processing. Suitable examples of such equipment include pipes, tubes, capillaries, mixing devices and, in particular, filters. The filter may be of any type, including polymer membranes wherein the polymer may be polyvinylpyrrolidone, polysulphone, polyether-sulphone and certain types of polyamides, and ceramic membranes made of e.g. silica, aluminium oxide etc.

The process of the invention may proceed by oxidation and/or solubilisation of carbohydrates and other high molecular weight primary alcohols such as proteinaceous materials, polyphenolic compounds, in residues to be removed from the filters. Such cleaning procedures are preferably carried out by treating the equipment with an aqueous solution of the nitroxyl compound and the peracid. The concentration of the nitroxyl compound can advantageously be in the range of 1 to 100 mg per 1, especially 3 to 30 mg/l, and the concentration of the peracid can be in the range of 0.025 to 10 g per 1, in particular 0.25–2.5 g/l. The process of the invention can be performed as a static process, i.e. batch-wise treatment of the equipment in a suitable container containing the treatment liquid for e period of between several seconds and several hours, especially between 3 minutes and 1 hour. The process can also be a dynamic process, i.e. a process wherein a continuous or semi-continuouis flow of the treatment liquid is passed over or through the equipment, e.g. at a rate of 5 ml to 10 l per minute, depending on the size of the equipment. After the nitroxyl and peracid treatment, the equipment is rinsed with rinsing liquid, which can be water or a neutralising aqueous liquid or an organic solvent such as an alcohol solution, or a mixture or sequential combination thereof. Further details on the nitroxyl-catalysed treatment of filters and other equipment in the food industry can be found in WO 97/45523, which is incorporated herein by reference. WO 99/15256, incorporated herein by reference, gives further details on the nitroxyl-catalysed treatment of filters in water purification.

EXAMPLE 1

Cleaning Filters Using Hypochlorite/TEMPO

A filtration membrane (hollow tube containing 40 membrane hollow fibers (pore size 0.5 micron) with a total surface area of 0.04 $m^2$ (resembling the X-low R-100 modules used in large scale facilities) was used for filtering beer. The membranes were fouled using a dead-end filtration technique until the pores were blocked resulting in minimal permeate or flux.

A solution containing 1000 ppm of hypochlorite and 35 ppm of TEMPO for half an hour was used to clean the membranes. The reaction pH was adjusted to 10. The cold water flux (cwf) of the virginal membrane was 6000 l/h/$m^2$. The cwf after cleaning was also 6000 l/h/$m^2$.

EXAMPLE 2

Cleaning Filters Using Hypochlorite/bromide/TEMPO

A solution containing 1000 ppm of hypochlorite, 60 ppm bromide, and 35 ppm of TEMPO for half an hour was used to clean the membranes fouled according to Example 1. The reaction pH was adjusted to 10. The cold water flux (cwf) of the virginal membrane was 6000 l/h/$m^2$. The cwf after cleaning was also 6000 l/h/$m^2$.

EXAMPLE 3

Cleaning Filters Using Peroxosulphuric Acid/TEMPO

A solution containing 1000 ppm of peroxosulphuric acid and 35 ppm of TEMPO for half an hour was used to clean the membranes fouled according to Example 1. The reaction pH was adjusted to 8. The cold water flux (cwf) of the virginal membrane was 6000 l/h/$m^2$. The cwf after cleaning was also 6000 l/h/$m^2$.

EXAMPLE 4

Cleaning Filters Using a Manganese Complex/hydrogen Peroxide/TEMPO

Menbranes as fould according to Example 1 were cleaned. The cleaning sequence started with a pretreatment of flushing the membranes with 0.5 M sodium hydroxide solution for 10 minutes followed a solution containing 2000 ppm of hydrogen peroxide (or 2000 ppm peracetic acid), 100 ppm of TEMPO, and 50 ppm of an Mn complex with 1,4,7-trimethyl-1,4,7-triazonane for half an hour was used to clean the membranes. The reaction pH was adjusted to 10. The cold water flux (cwf) of the virginal membrane was 6000 l/h/$m^2$. The cwf after cleaning was also 6000 l/h/m.

EXAMPLE 5

Membrane Stability Data (a) Stability in Water:

Six membranes (type MF05 M2 1.5 mm) derived from a virginal membrane module (type RX 300) were placed in a vessel containing water at ambient temperature for two months. At the end of the experiment the force needed to break the membranes was measured with a material tester from Stable Micro Systems type TA-HD equiped with a 50 N cell. The results are presented in table 1.

TABLE 1

| Maximum force needed to break the membrane | |
|---|---|
| Membrane | Max. force for breaking (N) |
| 1 | 9.31 |
| 2 | 9.12 |
| 3 | 9.82 |
| 4 | 9.77 |
| 5 | 9.21 |
| 6 | 8.88 |

Mean 9.35 N
Standard deviation 0.37

(b) Influence of Sodium Hypochlorite:

Seven membranes (type MF05 M2 1.5 mm) derived from a virginal membrane module (type RX 300) were placed in a vessel containing a cleaning solution (35 ppm TEMPO, 1000 ppm sodium hypochlorite at pH 10 and ambient temperature). The cleaning solution was refreshed every week during 2 months. At the end of the experiment the force needed to break the membranes was measured with a material tester from Stable Micro Systems type TA-HD equiped with a 50 N cell. The results are presented in table 2.

TABLE 2

The maximum force needed to break the membranes

| Membrane | Max. force for breaking (N) |
| --- | --- |
| 1 | 4.98 |
| 2 | 6.40 |
| 3 | 4.85 |
| 4 | 6.49 |
| 5 | 5.80 |
| 6 | 5.16 |
| 7 | 5.96 |

Mean 5.66 N
Standard deviation 0.673

(c) Influence of Sodium Hypochlorite/Sodium Bromide:

Eight membranes (type MF05 M2 1.5 mm) derived from a virginal membrane module (type RX 300) were placed in a vessel containing a cleaning solution (35 ppm TEMPO, 1000 ppm sodium hypochlorite and 60 ppm sodium bromide at pH 10 and ambient temperature). The cleaning solution was refreshed every week during 2 months. At the end of the experiment the force needed to break the membranes was measured with a material tester from Stable Micro Systems type TA-HD equipped with a 50 N cell. The results are presented in table 3.

TABLE 3

The maximum force needed to break the membranes

| Membrane | Max. force for breaking (N) |
| --- | --- |
| 1 | 5.03 |
| 2 | 5.98 |
| 3 | 6.03 |
| 4 | 4.24 |
| 5 | 5.83 |
| 6 | 6.55 |
| 7 | 3.36 |
| 8 | 4.58 |

Mean 5.20 N
Standard deviation 1.085

(d) Influence of Peroxosulphuric Acid:

Six membranes (type MF05 M2 1.5 mm) derived from a virginal membrane module (type RX 300) were placed in a vessel containing a cleaning solution (35 ppm TEMPO, 1000 ppm peroxosulphuric at pH 8 at ambient temperature). The cleaning solution was refreshed every week during 2 months. At the end of the experiment the force needed to break the membranes was measured with a material tester from Stable Micro Systems type TA-HD equipped with a 50 N cell. The results are presented in table 4.

TABLE 4

The maximum force needed to break the membranes

| Membrane | Max. force for breaking (N) |
| --- | --- |
| 1 | 9.50 |
| 2 | 8.79 |
| 3 | 9.33 |
| 4 | 8.60 |
| 5 | 9.47 |
| 6 | 8.48 |

Mean 9.03 N
Standard deviation 0.46

It is to be concluded that the membranes are susceptible to breakage when oxidants like hypochlorite/bromide (hypohalites) are used in combination with TEMPO as a cleaning agent. The standard deviation in the forces needed to break the membranes increases significantly due to the addition of bromide to the hypochlorite/TEMPO cleaning solution. Therefore the chance of breakage of the membranes during a full scale filtration (for instance beer) is significant higher when bromide is added to the cleaning solution (TEMPO/hypochlorite).

Furthermore the use of peroxosulphuric acid in combination with TEMPO seems to have a very minor effect only on the membranes in terms of breakage. The use of peroxosulphuric acid in combination with TEMPO as a cleaning agent is more favourable then hypohalites/TEMPO due to the fact that no halides are present in the waste. Another important advantage of peroxosulphuric acid is that corrosion of the filtration equipment does not occur compared to the hypohalite formulations.

The invention claimed is:

1. A halogen-free method for cleaning food processing equipment, comprising contacting the equipment with
    1) a cyclic nitroxyl and one of a peracid or hydroperoxide reoxidator, or with
    2) a nitroxonium compound.
2. The method according to claim 1, wherein the reoxidator is a peracid or a salt thereof.
3. The method according to claim 2, wherein the peracid is peracetic acid.
4. The method according to claim 3, wherein the peracid is produced in situ from hydrogen peroxide or from compounds releasing hydrogen peroxide.
5. The method according to claim 3, wherein the hydroperoxide is hydrogen peroxide in the presence of a metal complex or an oxidative enzyme.
6. The method according to claim 3, wherein the reoxidator is used in an aqueous solution in a concentration of 25–2500 ppm.
7. The method according to claim 2, wherein the peracid is persulphuric acid.
8. The method according to claim 7, wherein the peracid is produced in situ from hydrogen peroxide or from compounds releasing hydrogen peroxide.
9. The method according to claim 7, wherein the hydroperoxide is hydrogen peroxide in the presence of a metal complex or an oxidative enzyme.
10. The method according to claim 7, wherein the reoxidator is used in an aqueous solution in a concentration of 25–2500 ppm.
11. The method according to claim 2, wherein the peracid is produced in situ from hydrogen peroxide or from compounds releasing hydrogen peroxide.
12. The method according to claim 11, wherein the reoxidator is used in an aqueous solution in a concentration of 25–2500 ppm.
13. The method according to claim 2, wherein the hydroperoxide is hydrogen peroxide in the presence of a metal complex or an oxidative enzyme.
14. The method according to claim 13, wherein the reoxidator is used in an aqueous solution in a concentration of 25–2500 ppm.

15. The method according to claim 2, wherein the reoxidator is used in an aqueous solution in a concentration of 25–2500 ppm.

16. The method according to claim 1, wherein the cyclic nitroxyl compound is 2,2,6,6,-tetramethylpiperidin-1-oxyl (TEMPO) or a 4-hydroxy-, 4-acyloxy- or 4-acylamino derivative thereof.

17. The method according to claim 1, wherein the nitroxonium compound has been prepared previously using a metal complex or an oxidative enzyme.

18. The method according to claim 1, wherein the equipment comprises a membrane filter.

* * * * *

UNITED STATES PATENT AND TRADEMARK OFFICE
CERTIFICATE OF CORRECTION

PATENT NO. : 7,052,557 B2  Page 1 of 1
APPLICATION NO. : 10/501584
DATED : May 30, 2006
INVENTOR(S) : Jetten et al.

It is certified that error appears in the above-identified patent and that said Letters Patent is hereby corrected as shown below:

<u>On Title Page</u>, See Item (56) References Cited, FOREIGN PATENT DOCUMENTS, insert the following three documents:

| WO | 97/45523 | A1 | 12/1997 |
| WO | 99/57158 | A1 | 11/1999 |
| WO | 00/50621 | A2 | 08/2000 |

Signed and Sealed this

Thirteenth Day of February, 2007

JON W. DUDAS
*Director of the United States Patent and Trademark Office*